United States Patent
Tsurushima et al.

(10) Patent No.: US 6,814,137 B2
(45) Date of Patent: Nov. 9, 2004

(54) AUTOMOTIVE AIR CONDITIONER

(75) Inventors: Akihiro Tsurushima, Tokyo (JP); Katsuhiro Kurokawa, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/216,208

(22) Filed: Aug. 12, 2002

(65) Prior Publication Data

US 2002/0189787 A1 Dec. 19, 2002

Related U.S. Application Data

(63) Continuation of application No. 09/522,894, filed on Mar. 10, 2000, now Pat. No. 6,453,991.

(30) Foreign Application Priority Data

Mar. 29, 1999 (JP) ............................................ 11-086750
Jan. 18, 2000 (JP) ...................................... 2000-009529

(51) Int. Cl.$^7$ ............................................... B60H 1/00
(52) U.S. Cl. ......................... 165/202; 165/203; 165/42; 165/103; 454/75; 454/160
(58) Field of Search ........................... 165/42, 43, 201, 165/202, 203, 100, 103; 454/69, 121, 143, 156, 159, 160, 75, 126, 145

(56) References Cited

U.S. PATENT DOCUMENTS

| | | | |
|---|---|---|---|
| 3,847,210 A | * 11/1974 | Wells ........................... | 165/103 |
| 4,060,024 A | * 11/1977 | Deck | |
| 4,646,206 A | 2/1987 | Bauer et al. | |
| 5,186,237 A | 2/1993 | Adasek et al. ................. | 165/42 |
| 5,676,595 A | * 10/1997 | Sumiya et al. ............... | 454/121 |
| 5,701,949 A | * 12/1997 | Yamaguchi et al. ........... | 165/42 |
| 5,881,558 A | 3/1999 | Kawahara et al. ............. | 62/408 |
| 5,899,806 A | 5/1999 | Hase et al. ................... | 454/156 |
| 5,921,527 A | * 7/1999 | Ikawa et al. .................. | 454/69 |
| 6,048,263 A | 4/2000 | Uchida et al. ............ | 165/204 X |
| 6,062,298 A | 5/2000 | Lee .............................. | 165/42 |
| 6,085,834 A | * 7/2000 | Thomas et al. ......... | 165/103 X |
| 6,138,749 A | 10/2000 | Kawai et al. ................ | 165/204 |
| 6,145,754 A | * 11/2000 | Uemura et al. ........... | 165/42 X |
| 6,224,480 B1 | 5/2001 | Le et al. ...................... | 454/160 |
| 6,254,475 B1 | * 7/2001 | Danieau et al. .............. | 454/156 |
| 6,270,400 B1 | 8/2001 | Tsurushima et al. ........ | 454/121 |
| 6,305,462 B1 | 10/2001 | Tsurushima et al. ......... | 165/43 |
| 6,308,770 B1 | * 10/2001 | Shikata et al. ............ | 165/43 X |
| 6,382,305 B1 | * 5/2002 | Sano ........................... | 165/43 |
| 6,427,770 B2 | * 8/2002 | Beck et al. .................. | 165/203 |
| 6,482,081 B2 | * 11/2002 | Vincent et al. ........... | 165/43 X |
| 6,581,678 B1 | * 6/2003 | Groemmer et al. ........... | 165/42 |
| 6,607,029 B2 | * 8/2003 | Danieau ...................... | 165/203 |

FOREIGN PATENT DOCUMENTS

| | | |
|---|---|---|
| DE | 28 36 800 | 3/1980 |
| DE | 198 07 002 | 10/1998 |
| DE | 198 11 548 A1 * | 10/1998 |
| EP | 0 856 423 A1 * | 8/1998 |

(List continued on next page.)

OTHER PUBLICATIONS

Toshikatsu; "Car Air Conditioner and itsa Duct Casing"; Patent Abstracts of Japan; vol. 017, No. 368; Publication No.: 05 058144; Publication Date: Mar. 9, 1993.

Primary Examiner—Ljiljana Ciric
(74) Attorney, Agent, or Firm—Foley & Lardner LLP

(57) ABSTRACT

A downstream side air passage of a an automotive air conditioner unit is partitioned into at least two or more independent small air passages with a plurality of partition plates extending along an air flow direction. Doors are provided for the respective small air passages and the small air passages each can distribute air that is independently conditioned to desired temperatures within themselves. A driving mechanism drives the doors in a slidable fashion.

28 Claims, 9 Drawing Sheets

FOREIGN PATENT DOCUMENTS

| | | | |
|---|---|---|---|
| FR | 2 556 290 A1 * | 6/1985 |
| FR | 2 724 873 | 3/1996 |
| JP | 60-193713 * | 10/1985 |
| JP | 5-58144 | 3/1993 |
| JP | 11-099818 | 4/1999 |
| JP | 11-099820 | 4/1999 |
| WO | 96/16827 * | 6/1996 |
| WO | 96/29211 | 9/1996 |
| WO | 98/34805 | 8/1998 |

AUTOMOTIVE AIR CONDITIONER

This application is a continuation of U.S. patent application Ser. No. 09/522,894, filed Mar. 10, 2000 now U.S. Pat. No. 6,453,991, and is incorporated herein by reference in its entirety.

BACKGROUND OF THE INVENTION

1. Field of the Invention

The present invention relates to an automotive air conditioner having a plurality of independent air passages within a casing, and more particularly to an automotive air conditioner which can independently air-condition a plurality of portions within a passenger compartment of a vehicle.

The present application is based on Japanese Patent Applications No. Hei. 11-86750 and No. 2000-9529, which are incorporated herein by reference.

2. Description of the Related Art

In some of conventional automotive air conditioners, the driving seat and the front passenger seat are independently air-conditioned. In recent years, however, there is growing a demand for an independent air-conditioning for the rear seats, as well as those front seats.

This demand can easily be realized by utilizing a plurality of automotive air conditioners, but in view of the fact that there is not much extra space in the narrow passenger compartment, it is desirable that the demand is satisfied with a single automotive air conditioner.

Independent air-conditioning for the front and rear seats means that a separate air-conditioning part has to be provided independently within an automotive air conditioner provided in front of the front seats. It is relatively easy to provide the separate air-conditioning part as an independent unit in the automotive air conditioner.

As described above, however, in view of the actual state in which the passenger compartment is narrow, providing less extra space therein and in which there is growing a strong demand for making the automotive air conditioner more and more compact, it is not realistic or even possible to provide a separate independent air-conditioning unit in a single automotive air conditioner, and therefore, currently an early solution to this problem has been long waited for.

SUMMARY OF THE INVENTION

The present invention was made with a view to solving the aforesaid technical problem, and an object thereof is to provide an automotive air conditioner in which two or more small air passages are formed within a single unit and which can independently condition air flows flowing through the respective small air passages to certain temperatures.

The object of the present invention is to be attained with the following means.

(1) According to a first feature of the invention, there is provided an automotive air conditioner wherein an upstream side air passage in which an evaporator is provided and a downstream side air passage through which an air flow cooled by the evaporator flows are formed within a casing and wherein a door is provided in the downstream side air passage for allowing the air flow from the upstream side air passage to selectively flow toward a heater core provided in the downstream side air passage or a bypass air passage which bypasses the heater core, or to flow at a predetermined ratio into the heater core and the bypass air passage, the door being disposed in such a manner as to slide in a direction to shut off the air flow, the automotive air conditioner being characterized in that the downstream side air passage is partitioned by a plurality of partition plates extending along a direction in which the air flow flows such that at least two or more independent small air passages are formed therein, in that the door is provided for the small air passages so formed, respectively, and in that the respective doors are constructed so as to be caused to slide independently from the outside of the casing.

(2) According to a second feature of the invention, there is provided an automotive air conditioner wherein a door is provided between an upstream side air passage and a downstream side air passage both formed in a casing for allowing an air flow from the upstream side air passage to flow into the downstream side air passage in one air stream or two branched air streams, the door being constructed so as to be driven by a driving mechanism, the automotive air conditioner being characterized in that the driving mechanism having toothed portions formed in both sides of the door along a direction in which the door moves, gears adapted to be brought into mesh engagement with the toothed portions, respectively and a driving source provided outside the casing, and in that one of the gears adapted to be brought into mesh engagement with the toothed portions is made to be a driving gear adapted to be driven by the driving source, while the other gear is made to be a follower gear adapted to be rotated by the toothed portion formed in the door.

(3) According to a third feature of the invention, there is provided an automotive air conditioner wherein the respective doors are disposed on a plane extending in a direction to shut off the air flow.

(4) According to a fourth feature of the invention, there is provided an automotive air conditioner wherein in the driving mechanism, the gears for the door provided for the intermediately positioned small air passage of the three or more small air passages are rotatably supported on the partition plates.

(5) According to a fifth feature of the invention, there is provided an automotive air conditioner wherein in the driving mechanism, external gears adapted to directly receive a force from the driving sources and the driving gears adapted to be brought into mesh engagement with the toothed portions formed in the respective doors are disposed on the same axis, and in that a double-shaft construction is adopted for shafts for driving the driving gears and the external gears.

Features and advantages of the invention will be evident from the following detailed description of the preferred embodiments described in conjunction with the attached drawings.

DETAILED DESCRIPTION OF THE PREFERRED EMBODIMENTS

Figure 1:
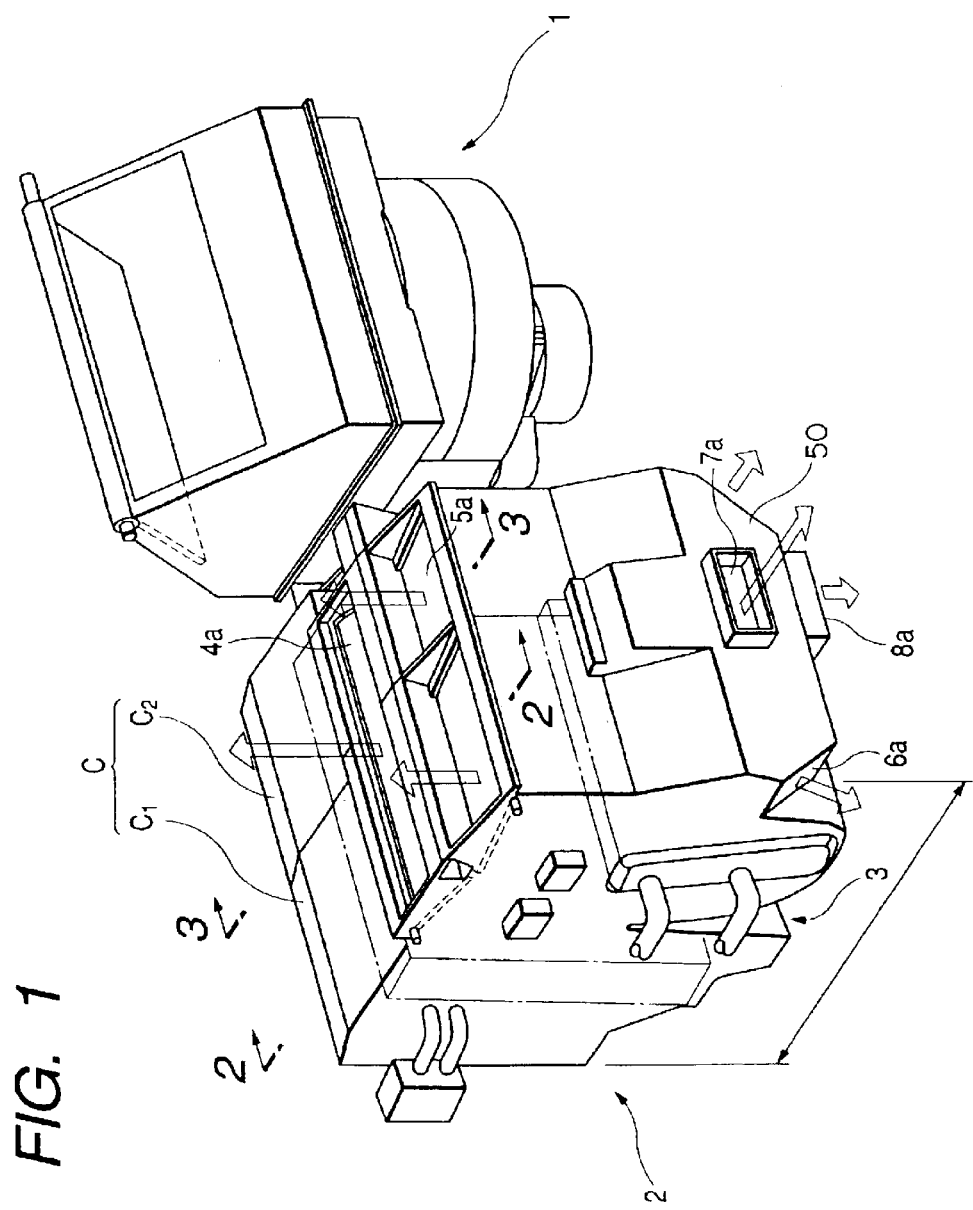
FIG. 1 shows an overall perspective view showing one embodiment of the present invention.

Referring to the drawings, a mode for carrying out the invention will be described below.

Figure 2:
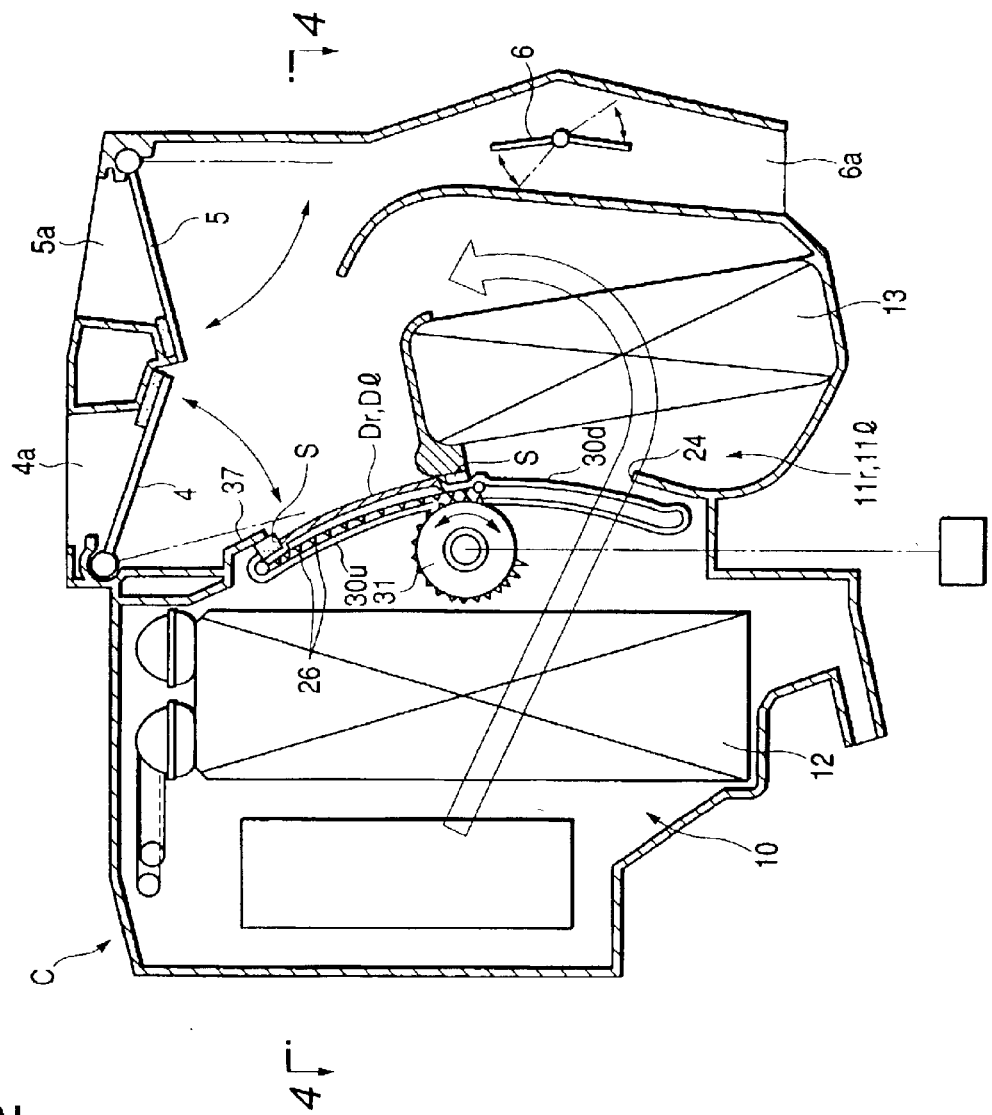
FIG. 2 shows a sectional view taken along the line II—II of FIG. 1.
Figure 3:
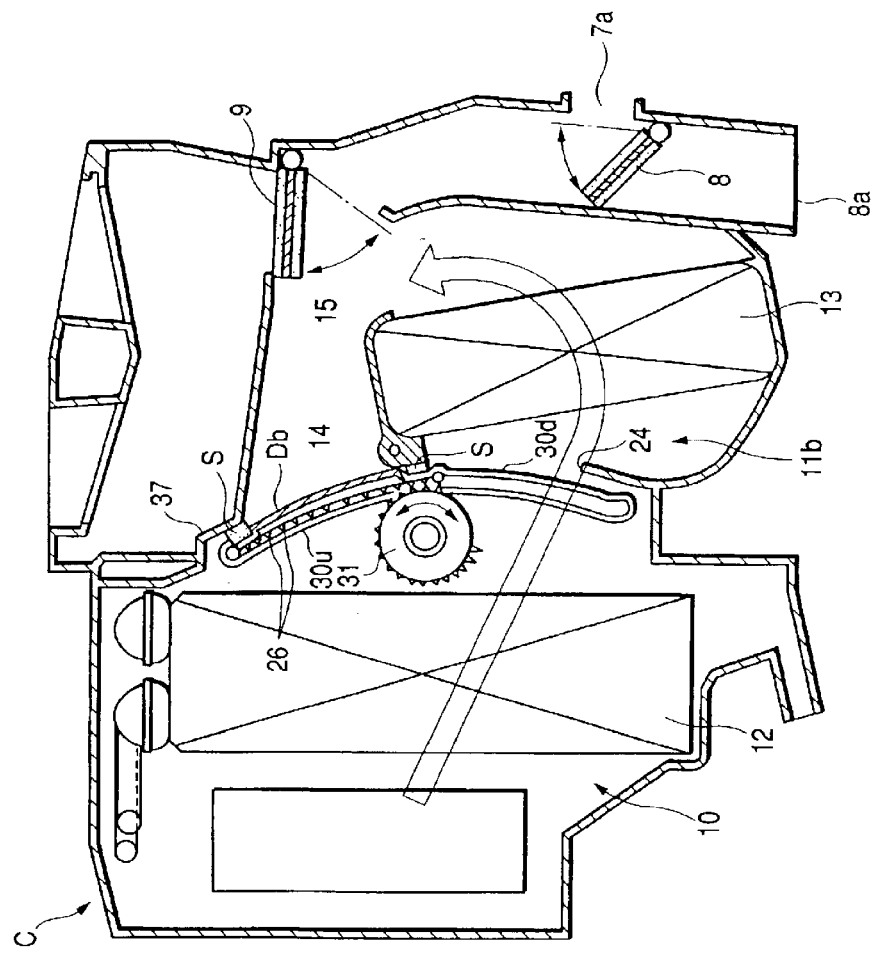
FIG. 3 shows a sectional view taken along the line III—III of FIG. 1.
Figure 4:
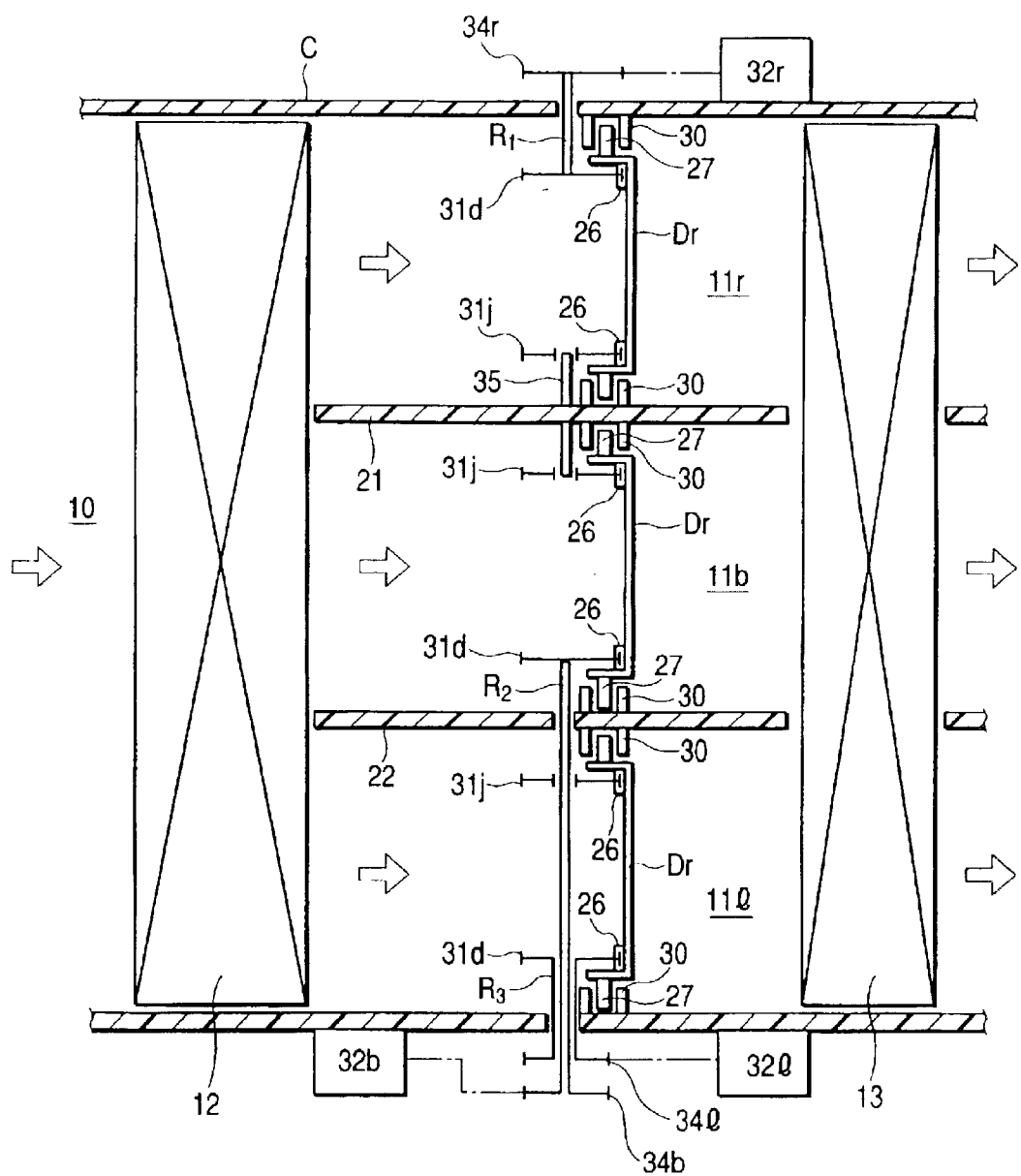
FIG. 4 shows a sectional view taken along the line IV—IV of FIG. 2.

FIG. 1 is a schematic overall perspective view of an automotive air conditioner according to an embodiment of the invention, FIG. 2 a sectional view taken along the line II—II of FIG. 1, FIG. 3 a sectional view taken along the line III—III of FIG. 1, and FIG. 4 a sectional view taken along the line IV—IV of FIG. 2.

As shown in FIG. 1, an automotive air conditioner according to an embodiment of the invention comprises an intake unit 1 for selectively introducing passenger-compartment or inside air or outside air, a cooler unit 2 and a heater unit 3. The cooler unit 2 and the heater unit 3 are integrated into one unit, which is then coupled to the intake unit 1. The integration of the cooler unit 2 and the heater unit 3 is attributed to the idea that aligning the two units in a longitudinal direction of the vehicle can reduce the longitudinal dimension L of the automotive air conditioner and hence it can be made compact.

Provided in a casing (C) are a defroster outlet 4a which is to be opened when a defrosting mode is activated for clearing fogging of the windshield and the other windows, vents 5a which are to be opened when a ventilating mode is activated for discharging cold air toward the upper bodies of the driver and the front-seat occupant, floor or foot outlets 6a which are to be opened when a floor or foot mode is activated for discharging hot air toward the lower bodies of the driver and front-seat occupant, a rear vent 7a for discharging cold air toward the rear seats and a rear floor or foot outlet 8a for discharging hot air toward the rear seats.

As shown in FIGS. 2 and 3, there is provided in the interior of the casing C an upstream side air passage 10 having provided therein an evaporator 12 the interior of which a refrigerant flows through, whereby inside and outside air taken in from the intake unit 1 is designed to be introduced into the evaporator for cooling. In addition, a heater core 13 is provided within a downstream side air passage 11 for hot engine coolant to flow through the interior thereof.

Then, a mixing door (hereinafter, simply referred to as a door D) adapted to vertically slide is provided between the evaporator 12 and the heater core 13, so that the cold air from the evaporator 12 is caused to branch into the heater core 13 side and a bypass passage 14 whereby the cold air from the evaporator 12 and the hot air from the heater core 13 are mixed with each other in a mixing zone 15 so as to produce conditioned air.

The distribution of this conditioned air flow is determined by respective doors (defroster door 4, vent door 5, foot door 6, front-rear door 9 or vent-foot door 8 for the rear seats) which are controlled to be rotated depending on the mode set for discharging into the passenger compartment from a defroster outlet 4a, vents 5a, foot outlets 6a, a rear vent 7 or rear foot outlets 9a.

These air passages 10, 11 are formed by coupling a pair of casing members C1, C2 together at open sides thereof just as in the way wafers are coupled together at open sides thereof, and when they are so coupled together, a door main body 23, which will be described later, the aforesaid evaporator 12 and heater core 13 are held and retained between the coupled casing members.

In particular, in this embodiment, as shown in FIG. 4, two partition plates 21, 22 are provided in the downstream side passage 11 downstream of the evaporator 12 along a direction in which the air flow flows within the casing C.

These partition plates 21, 22 extend from a downstream end of the evaporator to a downstream end wall 50 (refer to FIG. 1) of the casing C so as to partition substantially equally the downstream side passage 11 into three independent small (or sub) air passages 11r, 11l, 11b. These small passages are small air passages 11r, 11l for the driver's and front passenger's seats and a small air passage 11b for the rear seats.

Doors Dr, Dl, Db are provided for those respective small air passages, and driving mechanisms M are in turn provided for the respective doors, which are each constructed so as to independently be operated.

Namely, the air flow flowing down from the upstream side air passage 10 is caused by the partition plates 21, 22 to branch into the respective small air passages 11r, 11l, 11b so that air flows so divided are each caused by the doors provided respectively for the respective small air passages 11r, 11l, 11b to flow selectively into the heater core 13 side or the bypass passage side 14 or to branch at a predetermined ratio into the respective small air passages on the heater core side 13 or the bypass air passage 14.

Here, FIGS. 2 and 3 show clearly states in which the heated air flows are discharged toward the front seats after they have flowed through the small air passages 11r, 11l and in which the air flow is guided toward the rear seat after it has flowed through the small air passage 11b, respectively.

Furthermore, the doors D and the driving mechanisms M will be described in detail below.

Figure 5:
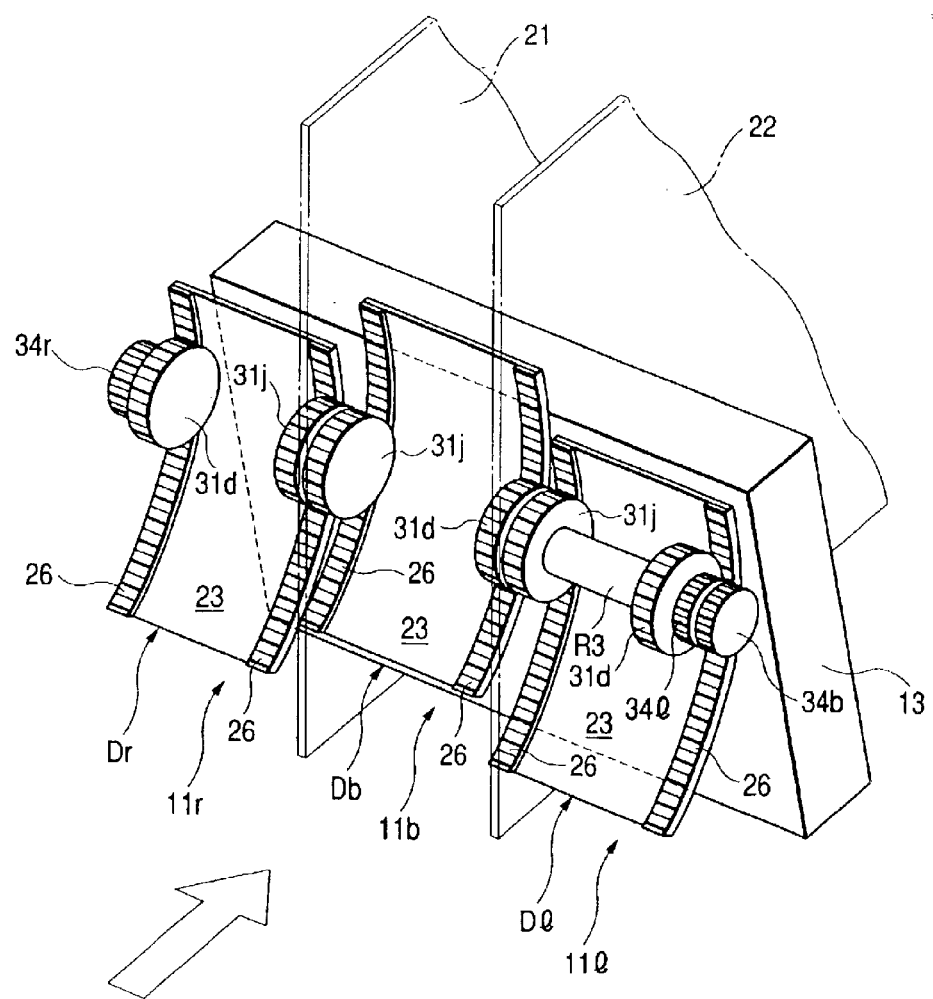
FIG. 5 shows a perspective view showing a relationship between doors and driving mechanisms.
Figure 6:
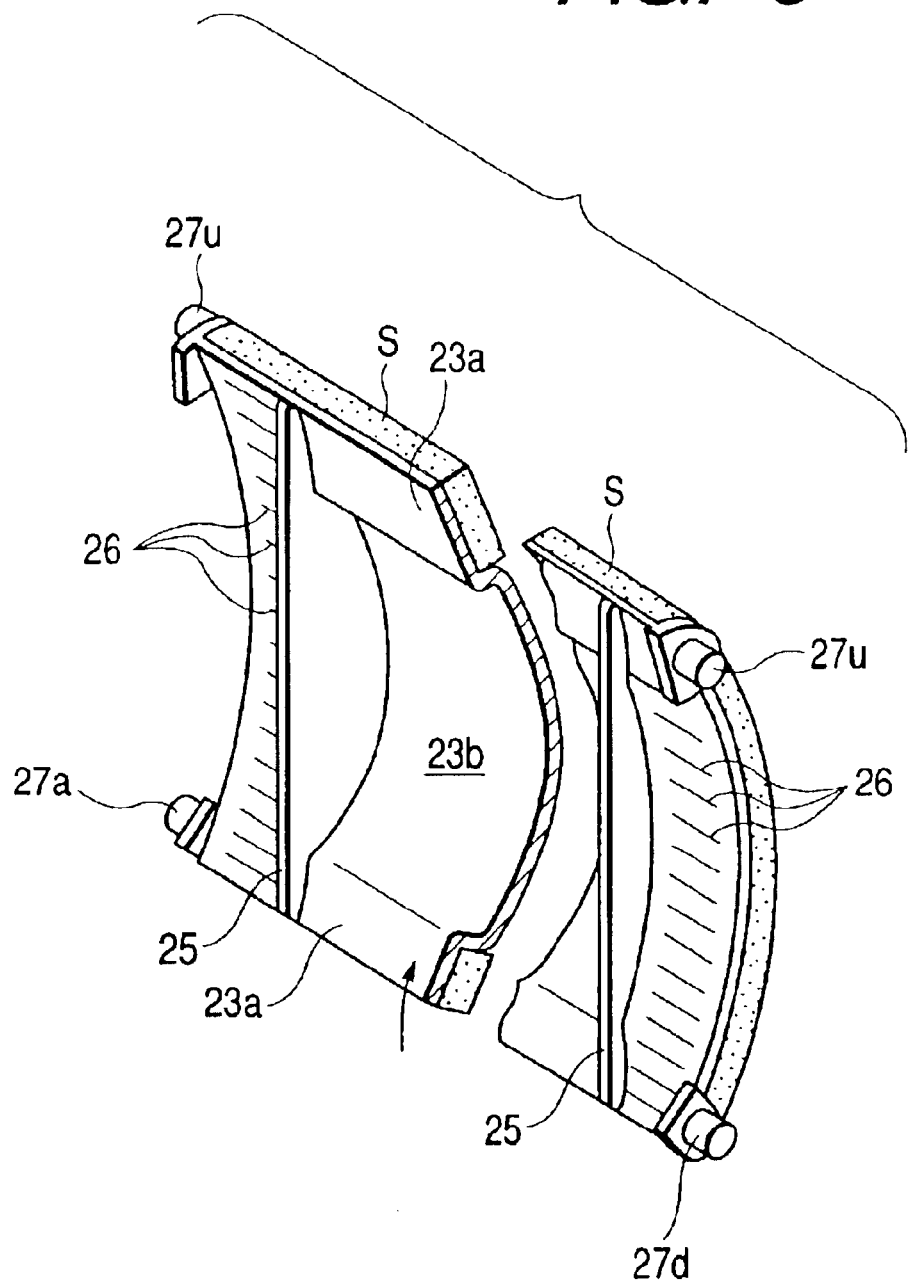
FIG. 6 shows a perspective view showing the door.
Figure 7:
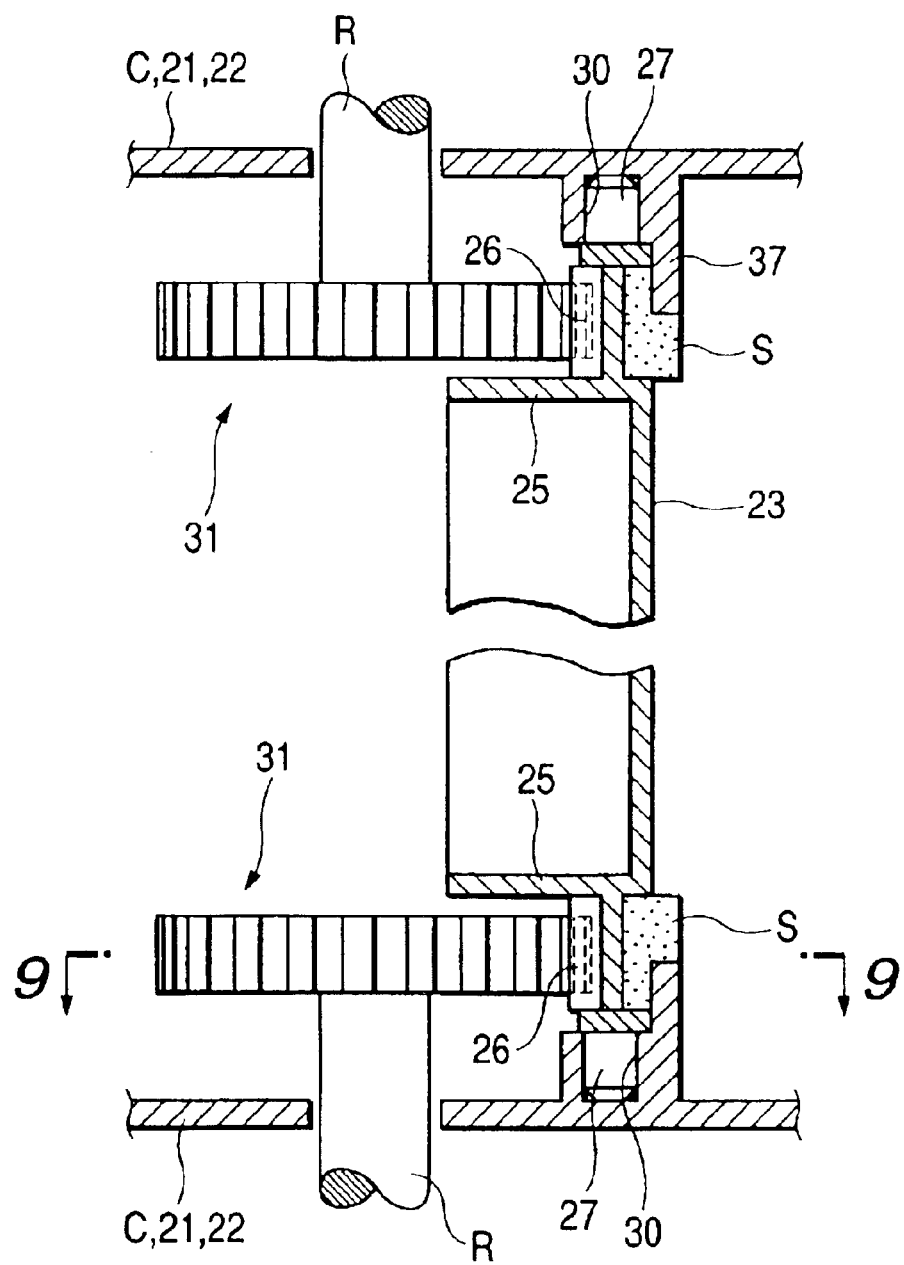
FIG. 7 shows a sectional view showing a state in which the driving mechanism are mounted on the door.
Figure 8:
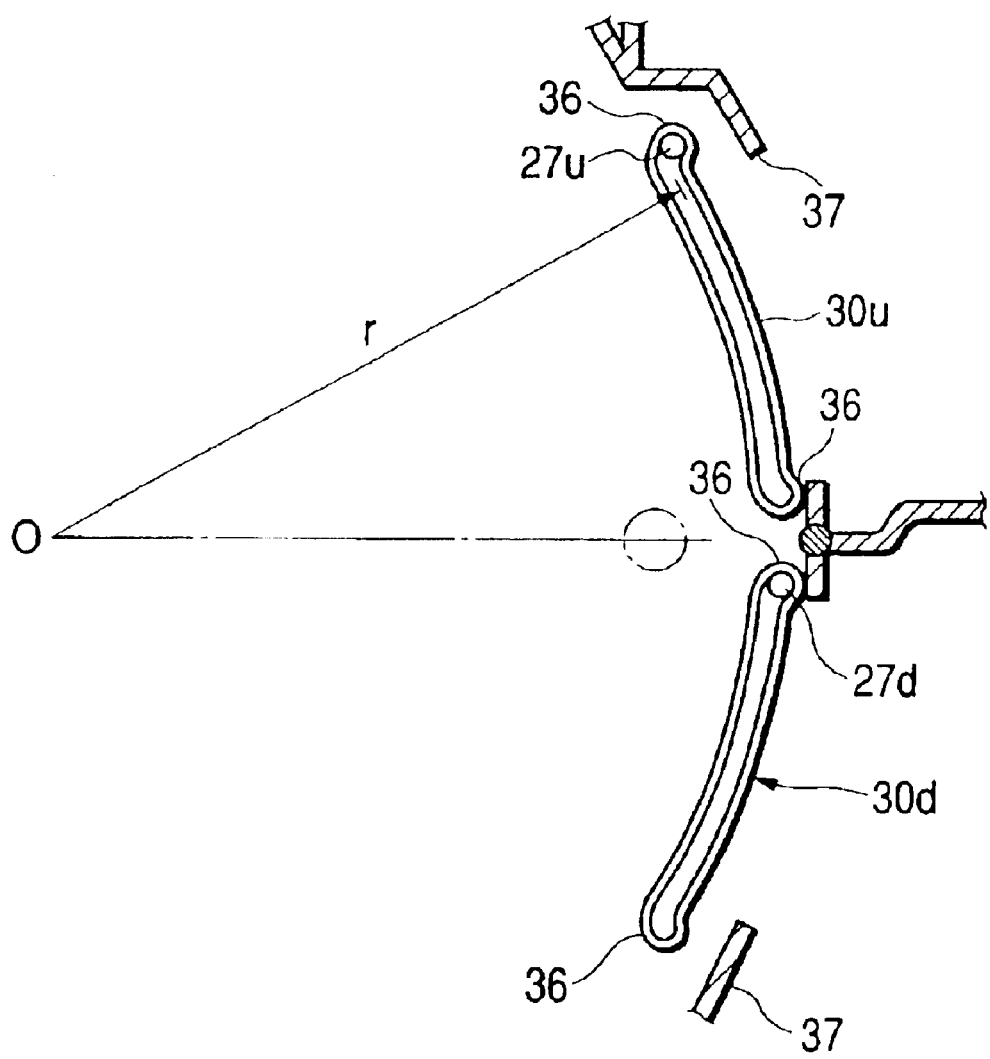
FIG. 8 shows an explanatory view explaining cam grooves.
Figure 9:
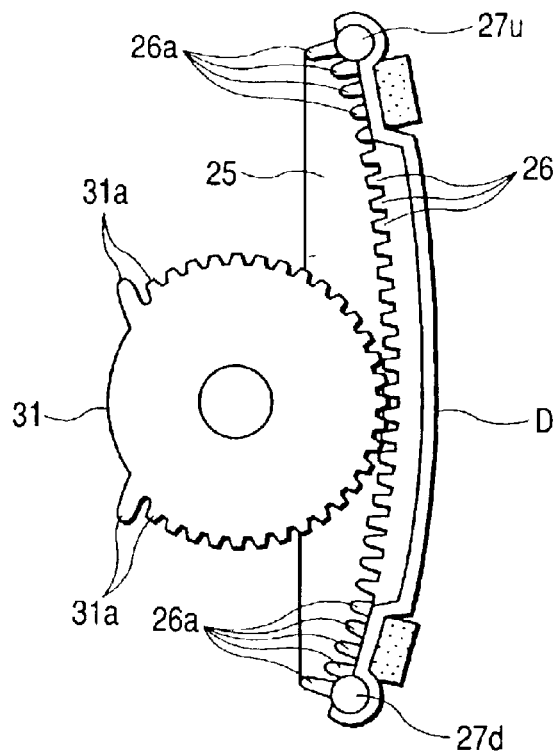
FIG. 9 shows a sectional view taken along the line IX—IX of FIG. 7.
Figure 10:
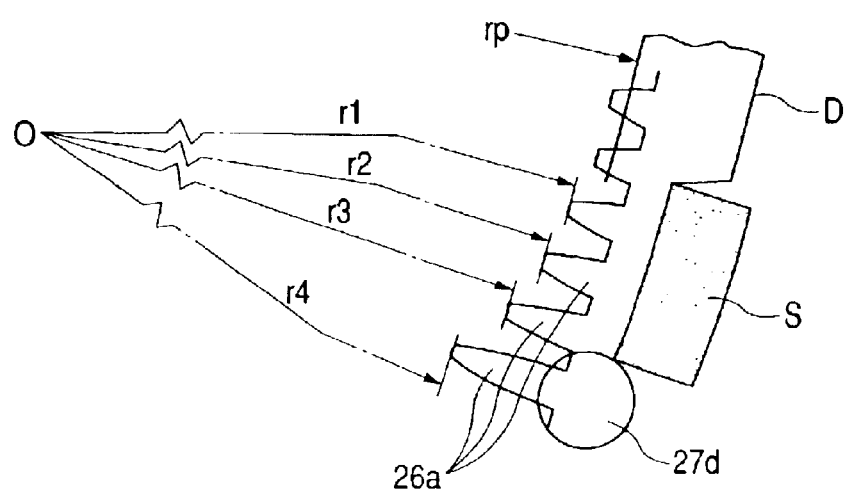
FIG. 10 shows an enlarged view showing a main part of FIG. 9.

FIG. 5 is a perspective view showing the relationship between the doors and driving mechanisms, FIG. 6 a perspective view showing the door, FIG. 7 a sectional view showing a state in which the driving mechanism is mounted on the door, FIG. 8 an explanatory view explaining a cam groove, FIG. 9 a sectional view taken along the line IX—IX of FIG. 7, and FIG. 10 an enlarged view showing a main part of FIG. 9.

As shown in FIGS. 5 and 6, these doors Dr, Dl, Db are constructed so as to be provided between the upstream side air passage 10 and the downstream side air passage 11 for allowing the air flow from the upstream side air passage 10 to flow down to the downstream side air passage 11 in one air stream or two branched air streams, and they are disposed on a plane extending in a direction to shut off the air flow from the upstream side air passage 10.

Thus, when the plurality of doors D are disposed on the same plane, in a case where they are driven with gears, the rotating shafts of the driving mechanisms can be disposed coaxially, and this helps facilitate the controlling of the doors and save on space to thereby make it possible to realize a compact air conditioner.

The respective doors Dr, Dl, Db have door main bodies 23 each extending in a direction to shut off the air flow from the upstream side air passage 10. Each of these door main bodies 23 has, as shown in FIG. 2, a vertical dimension substantially half a vertical dimension of an opening 24 between the upstream side air passage 10 and the downstream side air passage 11 and as shown in FIG. 4, a transverse dimension equal to the width of the respective small air passages 11r, 11l, 11b.

This door main body 23 has, as shown in FIG. 6, a flat portion 23a formed at a peripheral portion and a dome-like expanding portion 23b at an interior portion thereof, and a sealing member S made of a foamed urethane is securely affixed to the flat portions 23a. However, this sealing member S may be provided on not only the back of the expanding portion 23b but also the front side thereof.

In addition, a pair of reinforcement plates 25 are provided on sides of the door main body 23 which functions to not only reinforce the door main body 23 but also guide the air flow. Portions between these reinforcement plates 25 and the side edges of the door main body 23 are constructed such that the sections of the respective portions are formed into an arc-like shape, and toothed portions 26 are formed in those portions from one end to the other thereof for mesh engagement with gears 31 of the driving mechanism M, which will be described later (strictly speaking, in the embodiment of the invention, a partially toothed gear is used, but as a matter of convenience, it is simply referred to as a gear here. In addition, in FIG. 5, too, the gears are shown not as partially toothed gears but as fully toothed circular gears as a matter of convenience). In other words, the toothed portions 26 are formed in the both side portions of the door D in such a manner as to follow directions in which the door D moves.

Four guide rollers 27 (a general nomenclature for upper guide rollers 27u and lower guide rollers 27d) are provided at upper and lower ends of the side edges of the door main body in such a manner as to protrude therefrom so as to fit, respectively, in groove cams 30 protruding from inner side walls of the casing C or the partition plates 21, 22, the groove cam being described in detail later on. These guide rollers 27 may be cylindrical pins that cannot rotate when so required.

The door main body 23 is shaped like an arc which allows it to be brought into a rotating contact with the gear 31 adapted to be rotated by the driving source 32. As shown in the figure, this arc is curved "concavely" toward the flow of air, but it may also be curved "convexly" toward the flow of air. For instance, when the door main body 23 is curved "convexly," it helps not only improve the distribution property of air flow and the guiding property for guiding the air flow to the heater core 13 and the bypass passage B but also reduce the air resistance. On the contrary, when the door main body 23 is curved "concavely," it can be a guide when the air flow is directed to the heater core 13 and the bypass passage B, and the guiding function is provided with no ventilation resistance. Thus, the air flow guiding property can further be improved.

With this sliding type door D, it is possible not only to try to miniaturize the air conditioner unit but also to maintain the axis of air flow (air axis) constant since the air axis does not change irrespective of the door D opening conditions.

Namely, with a conventional door which is rotated about the rotating axis, the air flow direction is greatly changed by the door itself depending on the opening of the door, and this in turn changes the air axis. This results in an unexpected mixed condition of cold and hot air, and to cope with this, it is often required to obtain a desired air-conditioned state by providing an air-conditioning rib and changing the shape of the casing itself. With the sliding type door D, however, since the air flow is changed smoothly, the air axis does not change but remains constant.

If the air axis can be maintained constant, the doors can be laid out only by considering flows of air to the respective outlets, and when this construction is used for the mixing door, since hot air and cold air can be brought into collision with each other at a certain angle, a stable mixing property can be provided. Furthermore, since countermeasures only have to be taken based on the air axis in one direction when it is necessary to cope with the distribution of air flow and mixing property, not only can a smooth air flow distribution be provided but also the air-conditioning property can be maintained as originally designed, whereby it is possible to improve the air flow distribution and mixing property without providing the air-conditioning rib and changing the configuration of the casing.

As shown in FIG. 7, the driving mechanism has the groove cams 30, the gears 31 adapted to be brought into mesh engagement with the toothed portions 26 formed in one side of the door main body 23 and the driving source 32 comprising a motor or motor actuator provided outside the casing C. One of the gears 31 which are to be brought into mesh engagement with the toothed portions 26 of the respective doors Dr, Dl, Db is made a follower gear 31j adapted to be rotated by the toothed portion 26 of the door for which the gear is provided, and the other gear is made a driving gear 31d adapted to be driven by the driving source.

The state in which the driving gear 31 and the driving source 32 are coupled to each other differs with the respective small air passages, which is well shown in FIGS. 4 and 5.

First, with the small air passage 11r for the front right-hand seat, a driving gear 31d is coupled to an external gear 34r via a rotating shaft R1, and the external gear 34r is constructed so as to be driven to rotate by a force received directly by a driving source 32r. On the other hand, a follower gear 31j is rotatably supported on a supporting shaft 35 provided on the partition plate 21.

With the small air passage 11b for the rear seats, a driving gear 31d is coupled to an external gear 34b via a rotating shaft R2 extending through the small air passage 11l for the front left-hand side seat, and the external gear 34b is constructed so as to be driven to rotate by a force received directly from a driving source 32b. On the other hand, a follower gear 31j is rotatably supported on the supporting shaft 35.

With the small air passage 11l for the front left-hand side seat, a driving gear 31d is coupled to an external gear 34l via a rotating shaft R3, and the external gear 34l is constructed so as to be driven to rotate by a force received directly from a driving source 32l. On the other hand, a follower gear 31j is rotatably supported on the rotating shaft R2.

With this construction, the doors D can securely be caused to slide even if the rotating shafts R are not attached to all the gears, and this simplifies the construction and hence reduces the number of components involved, the man hours and costs required for assembly and the weight of an air conditioner produced. Moreover, the actuators do not have to be made large unnecessarily since no unnecessary rotating shaft R has to be rotated, and this is preferable from the viewpoint of power.

In addition, the rotating shaft R3 is provided outwardly of and coaxially with the rotating shaft R2. Thus, if the rotating shafts disposed on the same axis are put in a double construction, the driving sources 32 and the driving gears 31d can independently be operated by the double-construction shafts which are disposed on the same axis. Not only is this construction advantageous in terms of space, but it also provides little probability of air leakage and easy sealing.

The groove cams 30 are, as shown in FIG. 8, formed such that they have a radius of curvature that is substantially the same as that of the doors D, and the groove cams 30 support the four guide rollers 27 of the door main body 23, so that the door main body 23 can operate without looseness even if it receives the air pressure. The groove cams 30 are formed vertically in pairs and shaped like an arc on the inner side walls of the casing and the sides of the partition plates 21, 22, and the upper guide rollers 27 are adapted to fit in the upper groove cams 30u, while the lower guide rollers 27d are adapted to fit in the lower groove cams 30d. Terminating portions 36 of the respective groove cams 30u, 30d are formed such that the door main body 23 is moved in a direction intersecting with a direction in which the door main body slides when it reaches the respective terminating portions or that the door main body 23 is moved to be inclined rearward from the predetermined arc-like sliding direction shown in the illustrated embodiment of the invention.

With this construction, the sealing member S is brought into abutment with a partition wall 37 protruding from the casing C to thereby be pressurized, whereby the sealing property is designed to be improved. In other words, since the sealing member S is constructed so as not to be in abutment with the partition wall 37 all the time but to be so only when so required, the deterioration in sealing property is prevented for a long time, the sealing property being thereby improved. Moreover, there is caused no friction when the doors are operated, and preferably, no great operating force is needed. In this embodiment, the partition wall 37 of the casing C is utilized for a portion with which the sealing member S is brought into abutment, but such an abutment portion may be provided separately.

In this embodiment, the groove cams 30 are formed in pairs vertically on the respective casing walls or partition plates, but the invention is not limited thereto, and any configuration may be utilized, provided that the guide rollers 27 can be moved in the direction intersecting with the sliding direction of the door main body when they reaches the terminating portions. For example, a configuration maybe adopted in which the terminating portions 36 of the pair of vertical groove cams 30 are continuous with each other. With this configuration, the molding performance can be improved when the groove cams are formed from a synthetic resin.

In addition, the driving mechanism M comprises the groove cams 30, the gears 31, 34 and the shafts R, 35, but these constituent members can be integrated with the door D into one unit, and this unit may be inserted from an opening formed in the side wall of the casing C for installation. When this construction is adopted, various types of units can be formed for various types of models with the main components being used commonly over those various types of units for assembly thereto.

The details of the gears 31 and the toothed portions 26 are shown in FIGS. 9 and 10. Teeth at respective ends of the gear or teeth in the vicinity thereof are made longer than the remaining teeth of the gear so as to become longer teeth 31a in order for the door main body 23 to be moved in the direction intersecting with the sliding direction of the door main body when it reaches the terminating portion positions, and when the driving source 32 rotates the gear 31, the longer teeth 31a press against the door main body 23 via the toothed portions 26 formed in the door main body 23, and the door main body 23 moves along the groove cams 30.

On the other hand, in the toothed portions 26 formed in the door main body 23, teeth at upper and lower ends of the respective toothed portions 26 or in the vicinity thereof are made longer than the remaining teeth 26b so as to become longer teeth 26a. In other words, the distances between the tips of the teeth 26a formed at the ends of the toothed portion 26 and the rotating center O are constructed so as to vary gradually as indicated by r1, r2, r3, r4 shown in FIG. 10, and the longer teeth 26a of the toothed portions 26 are designed to securely be in mesh engagement with the longer teeth 31a of the gears 31 so that the door main body 23 is caused to slide along the groove cams 30. In FIG. 10, reference character "rp" denotes the pitch circle.

Next, an operation of the embodiment will be described.
(Fully Heating Mode)

In the heating mode, when a fully heating mode is activated in which the whole amount of cold air is heated for discharge into the passenger compartment, the door main body 23 is positioned at the upper end as shown in FIG. 2, so that the whole air taken in from the intake unit 1 and cooled at the cooler unit 2 is caused to pass through the heater core 13.

In this case, the driving source 32 for the desired portion can independently be operated with a signal from a controller outside of the figure; for example, the driving source 32r is operated for heating the front right-hand side seat, the driving source 32b for the rear seats, and the driving source 32l for the front left-hand side seat.

The respective gears 31 are rotated in association with the operation of the selected driving source 32, and the desired door main body 23 is caused to rise along the groove cams 30 so that the whole amount of cold air is allowed to pass through the heater core 13.

For example, as shown in FIG. 2, when the front left-hand side seat is selected for heating, hot air is distributed toward the feet of the passenger from the foot outlet 6a. In addition, when the rear seat is selected for heating, as shown in FIG. 3, the front-rear door 9 is opened, while the vent-foot door 8 closes the rear vent 7a (as shown by one-dot chain line), hot air is discharged toward the feet of the rear-seat passenger from the foot outlet 8a.

When the door main body 23 slides upward and reaches the terminating position, since the longer teeth 31a of the gears 31 are brought into mesh engagement with the longer teeth 26a of the toothed portions 26, the door main body 23 is pushed rearward by the gears 31, while it is moved rearward along the groove cams 30, and the sealing member S is brought into abutment with the partition wall 37 and is pressurized thereby.

As a result of this, the sealing property of the door main body 23 is improved, and since this prevents air leakage, a superior air-conditioning property can be provided. Moreover, since the doors are moved through the gear driving, a smooth operation can be provided and this improves the operability of the doors, whereby a comfortable door control can be provided which produces no abnormal noise.
(Air-Conditioning Mode)

In an air-conditioning mode in which hot air and cold air are mixed with each other so as to discharge a conditioned air of the desired temperature into the passenger compartment, the door main body 23 is located at a vertically intermediate position when viewed in FIG. 2. Consequently, a part of the cold air from the cooler unit 2 passes through an upper spaced area above the door main body 23, while the remaining portion of the cold air passes through a lower spaced area below the door main body 23 for introduction into the heater core 13.

In this case, too, the driving sources 32 are selectively operated by the controller, and the guide rollers 27 of the door main body 23 are moved along the groove cams 30 by virtue of the rotation of the gears 31 so selected so as to be positioned at a vertically intermediate position. In this state, since the guide rollers 27 are only in contact with the groove cams 30, the sliding resistance is very small and the operation is carried out smoothly. In addition, in this state, the door main body 23 is retained by virtue of mesh engagement between the gears 31 and the toothed portions 26 on the door main body 23 side, and therefore there is little risk of a deviation in position being caused. Should there occur a deviation in position, it would be just equal to the backlash between the gears 31 and the toothed portions 26 on the door main body 23 side, and therefore, the door position can be set extremely accurately.

Then, the cold air and hot air are merged and mixed with each other into a conditioned air of the desired temperature for discharge into the passenger compartment.

(Fully Cooling Mode)

In a cooling mode in which the whole amount of cold air is discharged into the passenger compartment with none of it being heated, the operation of the door main body is substantially identical that described in relation to the fully heating mode except that the door main body 23 is positioned at a vertically lowest end.

The present invention is not limited to the aforesaid embodiment but may be modified in various ways without departing from the scope of the claims.

For example, in the above embodiment, while there are formed three small air passages with two partition plates 21, 22, the invention is not limited thereto. It is needless to say that the invention may be applied to an embodiment in which the downstream side of air passage is divided into three or more small air passages by using a suitable number of partition plates, and it is also possible to form two small passages with a single partition plate.

While the doors are shaped like an arc in the above embodiment, they may be shaped linearly when so required. Alternatively, the configurations of the partially toothed gears and toothed portions on the door side, in particular, the configuration of the longer teeth may not be limited to that described in the illustrated embodiment but may be suitably modified as required by its relationship with the doors.

Furthermore, the aforesaid driving mechanism is now used as the mixing door for the automotive air conditioner comprising the evaporator and the heater core, but the invention is not limited thereto but may be applied to various types of doors, if doors to which the invention is tried to be applied are a door for allowing the air flow from the upstream side air passage to flow in a single air stream or dividing it into two branched air streams of cold air.

In addition, while the plurality of doors are driven in the above embodiment, the invention is effective even in a case where only one door is driven. Namely, if the driving gear is brought into mesh engagement with one of the toothed portions 26a formed in the both side edge portions of the door main body 23 with the other gear being brought into mesh engagement with the other, no shaft needs to extend across the front of the door main body 23 for installation, and therefore there is produced no resistance against the air flow, and hence the air flow can be controlled smoothly, whereby there is eliminated a risk of air noise being produced.

As has been described heretofore, according to the first feature of the invention, since it is constructed such that the downstream side air passage is partitioned into at least two independent small air passages with the plurality of partition plates, that the doors are provided for the respective small air passage and that the respective doors are caused to slide from the outside of the casing, the cooler unit can be made compact, while conditioned air of the desired temperature can independently be distributed to any desired area of the passenger compartment.

According to the second embodiment of the invention, since the driving mechanism is constructed such that one of the gears in mesh engagement with the toothed portions of the door is made the driving gear, while the other is made the follower gear adapted to be rotated via the door and the toothed portions of the door, the doors can securely be caused to slide without attaching the rotating shafts to all the gears. This further helps simplify the construction, reduce the number of components involved, the man hours and costs involved in assembly and the weight of the cooler unit and eliminate the necessity of enlarging the actuators unnecessarily.

According to the third feature of the invention, since the respective doors are disposed on the predetermined plane, in a case where the doors are driven with the gears, the rotating shafts of the driving mechanisms can be disposed coaxially, and therefore, the easy control and effective space utility can be provided.

According to the fourth feature of the invention, since the gears adapted to be brought into mesh engagement with the door provided for the intermediate one of the small air passages is rotatably supported on the partition plate, it is possible to make the rotating shaft shorter. It is also possible to simplify the construction and to reduce the number of components involved, the man hours and costs involved in assembly, and the weight of the cooler unit. Furthermore, since the rotating shaft does not have to be rotated unnecessarily, it is possible to try to make the unit compact in size and light in weight, and hence to improve the operability of the door, an abnormal noise-less comfortable door control being thereby provided.

According to the fifth feature of the invention, since the external gears adapted to receive the force directly from the driving sources and the driving gears in mesh engagement with the toothed portions of the respective doors are coupled together by means of the double-structured shafts which are disposed coaxially, the advantage can be provided with respect to the space utility, little air leakage is provided and the sealing is facilitated.

What is claimed is:

1. An automotive air conditioner comprising:

a casing;

an evaporator disposed in said casing;

an upstream air passage in said casing through which intake air is introduced into said evaporator;

a heater core disposed in said casing, said heater core positioned downstream from said evaporator;

a downstream air passage formed between said evaporator and said heater core, through which cooled air output from said evaporator flows;

at least one partition plate disposed in said downstream air passage, said partition plate forming independent sub-air passages in said downstream air passage;

a plurality of doors disposed in said downstream air passage, at least one of said plurality of doors being disposed in each of said independent sub air-passages, each door of said plurality of doors extending substantially parallel to one another and in the same plane, each of said plurality of doors including a toothed section;

a gear for causing sliding movement of said at least one of said plurality of doors by engagement with the toothed section of said at least one of said plurality of doors when said gear rotates; and a driving mechanism coupled to said gear and configured to drive said at least one of said plurality of doors in a slidable fashion, wherein each of said plurality of doors selectively controls the amount of said cooled air output from said evaporator flowing to said heater core, wherein each of said plurality of doors is capable of sliding independently of one another.

2. The automotive air conditioner of claim 1, wherein said at least one partition plate extends in a direction parallel to said airflow direction.

3. The automotive air conditioner of claim 2, wherein each of said doors extends in plane that is substantially perpendicular to said airflow direction, to stop air flow.

4. The automotive air conditioner of claim 1, wherein said at least one partition plate comprises two partition plates that are disposed in said downstream air passage, forming three independent sub-air passages in said downstream air passage.

5. The automotive air conditioner of claim 4, wherein said at least one of said plurality of doors is disposed in one of said three independent sub-air passages, and wherein said gear is supported by one of said two partition plates.

6. The automotive air conditioner of claim 4, wherein at least one of said sub-air passages directs air to at least one front seat vent, and another one of said sub-air passages directs air to a rear seat vent.

7. The automotive air conditioner of claim 6, wherein two of said sub-air passages direct air to at least one front seat vent, and the other said sub-air passage directs air to a rear seat vent.

8. The automotive air conditioner of claim 1, wherein said partition plate extends substantially completely in said downstream air passage, from said evaporator to said heater core.

9. The automotive air conditioner of claim 1, wherein each of said plurality of doors is controlled independently from one another.

10. The automotive air conditioner of claim 1, wherein each of said plurality of doors has substantially the same shape.

11. The automotive air conditioner of claim 1, further comprising a bypass passage, wherein each of said plurality of doors controls the amount of said cooled air output from said evaporator flowing in said bypass passage.

12. The automotive air conditioner of claim 11, wherein said at least one partition plate subdivides said bypass passage and said downstream passages into at least two bypass passages and at least two downstream passages, respectively.

13. The automotive air conditioner of claim 1, wherein said evaporator and said heater core each have flow faces, wherein the flow faces of said evaporator are disposed substantially parallel to the flow faces of said heater core.

14. The automotive air conditioner of claim 13, wherein the respective flow faces of said evaporator and said heater core are disposed substantially vertically.

15. The automotive air conditioner of claim 1, wherein said toothed section is provided along an outer edge surface of said one at least of said plurality of doors, and wherein said gear engages with said toothed section to achieve a sliding movement of said at least one of said plurality of doors.

16. The automotive air conditioner of claim 1, the automotive air conditioner having an air passage downstream of said heater core, the automotive air conditioner further comprising:

a downstream plate provided in the air passage downstream of said heater core, wherein said downstream plate diverts air passing through said heater core, to achieve mixing with air that bypasses said heater core.

17. The automotive air conditioner of claim 1, wherein said gear causes sliding movement of said at least one of said plurality of doors along a longitudinal axis of said at least one of said plurality of doors.

18. The automotive air conditioner of claim 1, wherein said gear for causing sliding movement of said at least one of said plurality of doors is spaced apart from other doors of said plurality of doors.

19. The automotive air conditioner of claim 1, wherein air-facing surfaces of each of said plurality of doors are positioned substantially parallel to one another in a same plane.

20. An automotive air conditioner comprising:

a casing;

an evaporator disposed in said casing;

an upstream air passage in said casing through which intake air is introduced into said evaporator;

a heater core disposed in said casing, said heater core positioned downstream from said evaporator;

a downstream air passage formed between said evaporator and said heater core, through which cooled air output from said evaporator flows;

a plurality of air mix doors positioned in said downstream air passage and substantially parallel to one another in a plane extending perpendicular to the direction of air flow;

a gear for causing sliding movement of at least one of said plurality of air mix doors by engagement with said at least one of said plurality of air mix doors when said gear rotates; and a driving mechanism coupled to said gear and configured to drive said at least one of said plurality of air mix doors in a slidable fashion;

wherein a first one of said plurality of air mix doors controls an amount of said cooled air flowing to said heater core and directed to a rear seat vent, and wherein a second one of said plurality of air mix doors controls an amount of said cooled air flowing to said heater core and directed to a front seat vent, wherein each of said plurality of air mix doors is capable of sliding independently of one another.

21. The automotive air conditioner of claim 20, wherein each of said plurality of air mix doors is controlled independently from one another.

22. The automotive air conditioner of claim 20, further comprising a bypass passage, wherein each of said plurality of air mix doors controls the amount of said cooled air output from said evaporator flowing in said bypass passage.

23. The automotive air conditioner of claim 20, wherein said evaporator and said heater core each have flow faces, wherein the flow faces of said evaporator are disposed substantially parallel to the flow faces of said heater core.

24. The automotive air conditioner of claim 23, wherein the respective flow faces of said evaporator and said heater core are disposed substantially vertically.

25. The automotive air conditioner of claim 20, wherein each of said plurality of air mix doors has substantially the same shape.

26. The automotive air conditioner of claim 20, wherein air-facing surfaces of each of said plurality of air mix doors are positioned substantially parallel to one another in a same plane.

27. The An automotive air comprising:

a casing;

an evaporator disposed in said casing;

an upstream air passage in said casing through which intake air is introduced into said evaporator;

a heater core disposed in said casing, said heater core positioned downstream from said evaporator;

a downstream air passage formed between said evaporator and said heater core, through which cooled air output from said evaporator flows;

at least one partition plate disposed in said downstream air passage, said partition plate forming independent sub-air passages in said downstream air passage;

a plurality of doors disposed in said downstream air passage, at least one of said plurality of doors being disposed in each of said independent sub air-passages, each door of said plurality of doors extending substantially parallel to one another and in the same plane, each of said plurality of doors including a toothed section;

a gear for causing sliding movement of said at least one of said plurality of doors by engagement with the toothed section of said at least one of said plurality of doors when said gear rotates; and a driving mechanism coupled to said gear and configured to drive said at least one of said plurality of doors in a slidable fashion, wherein each of said plurality of doors selectively controls the amount of said cooled air output from said evaporator flowing to said heater core, wherein said at least one of said plurality of doors has a concave expanding portion at an interior section thereof, to facilitate air flow in a corresponding one of the sub-air passages.

28. The automotive air conditioner of claim 27, wherein said at least one of said plurality of doors has first and second flat portions respectively disposed above and below said concave expanding portion.

* * * * *